(12) United States Patent  
Van Der Woning (10) Patent No.: US 9,561,909 B2  
(45) Date of Patent: Feb. 7, 2017

(54) EXTRUDER FOR USE IN A DISPENSER OF A LOOSE PRODUCT FOR THE PREPARATION OF BEVERAGES

(71) Applicant: KONINKLIJKE PHILIPS N.V., Eindhoven (NL)

(72) Inventor: Mark Ronald Van Der Woning, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/436,134

(22) PCT Filed: Jan. 15, 2014

(86) PCT No.: PCT/IB2014/058283  
§ 371 (c)(1),  
(2) Date: Apr. 16, 2015

(87) PCT Pub. No.: WO2014/115061  
PCT Pub. Date: Jul. 31, 2014

(65) Prior Publication Data  
US 2015/0259152 A1    Sep. 17, 2015

Related U.S. Application Data

(60) Provisional application No. 61/755,025, filed on Jan. 22, 2013.

(51) Int. Cl.  
*B65G 33/22*    (2006.01)  
*B65G 33/14*    (2006.01)  
(Continued)

(52) U.S. Cl.  
CPC .............. *B65G 33/38* (2013.01); *A47J 31/404* (2013.01); *B65G 33/14* (2013.01); *B65G 33/26* (2013.01);  
(Continued)

(58) Field of Classification Search  
CPC ........ A47J 31/404; B65G 33/38; B65G 33/26; B65G 33/14; B65G 33/22; B65G 220/04; B65G 2812/0572; B65G 65/46  
(Continued)

(56) References Cited

U.S. PATENT DOCUMENTS 3,710,991 A    1/1973  Callahan  
5,143,202 A *  9/1992  Lehmann .................. B65B 1/12  
                                                   198/670

(Continued)

FOREIGN PATENT DOCUMENTS

CN    201782602 U    4/2011  
DE    3045244 A1    10/1982  
(Continued)

*Primary Examiner* — Mark A Deuble (57) ABSTRACT

An extruder (100) for use in a dispenser (1) of a loose product (30) for the preparation of beverages, comprising: a housing (110), defining a product inlet (112), a product outlet (114), and a bore (116) that interconnects the product inlet and the product outlet; a screw feeder (120) including a screw blade (124) that is both rotatably and translatably received in the bore (116), such that it is axially movable along the longitudinal axis (/) between a first position and a second position; and a first sealing device (126*b*) that is configured to releasably fluidtightly seal a portion of the bore (116) interconnecting the product inlet (112) and the product outlet (114) in dependence of the axial position of the screw blade (124).

15 Claims, 3 Drawing Sheets

(51) Int. Cl.
 *B65G 33/38* (2006.01)
 *A47J 31/40* (2006.01)
 *B65G 33/26* (2006.01)

(52) U.S. Cl.
 CPC ........... *B65G 33/22* (2013.01); *B65G 2201/04* (2013.01); *B65G 2812/0572* (2013.01)

(58) Field of Classification Search
 USPC ........................................ 198/670, 671, 545
 See application file for complete search history.

(56) References Cited

U.S. PATENT DOCUMENTS

| | | | | |
|---|---|---|---|---|
| 5,353,994 | A | * | 10/1994 | Clark ....................... A21C 9/04 118/621 |
| 5,743,639 | A | * | 4/1998 | Puerner ............... B01F 15/0201 222/226 |
| 2001/0030107 | A1 | * | 10/2001 | Simpson ................ B65G 33/22 198/670 |
| 2010/0236419 | A1 | | 9/2010 | Righetti |
| 2014/0124335 | A1 | * | 5/2014 | Kerschbaumer ..... B65G 33/265 198/672 |

FOREIGN PATENT DOCUMENTS

| | | |
|---|---|---|
| EP | 0331271 A1 | 9/1989 |
| JP | H07121767 A | 5/1995 |
| WO | 0078188 A1 | 12/2000 |

\* cited by examiner

EXTRUDER FOR USE IN A DISPENSER OF A LOOSE PRODUCT FOR THE PREPARATION OF BEVERAGES

This application is the U.S. National Phase application under 35 U.S.C. §371 of International Application No. PCT/EP2014/058283, filed on Jan. 15, 2014, which claims the benefit of U.S. Provisional Application No. 61/755,025 filed on Jan. 22, 2013. These applications are hereby incorporated by reference herein.

FIELD OF THE INVENTION

The present invention relates to an extruder for use in a dispenser for dispensing loose products like, for instance, coffee ground, tea ground and cacao powder for the preparation of beverages.

BACKGROUND

An apparatus, for instance a vending machine or a kitchen appliance, that is configured to prepare beverages, e.g. coffee, tea and/or chocolate milk, may typically include a dispenser that serves to dispense a predetermined dose of a loose product towards an area in which the beverages are prepared. The dispenser may comprise a hopper and an extruder. The loose product, e.g. coffee ground, tea ground or cacao powder, may be contained in the hopper at a bottom side of which the extruder may be arranged. The extruder may include a screw feeder comprising a helical blade that, when it is driven in rotation, feeds an amount of loose product from the hopper towards a product outlet or discharge opening, from which the loose product is dispensed to a unit for the preparation of the beverage.

A drawback of many conventional apparatus of the above-described type stems from the use of hot water to prepare the beverage. The hot water, which may take the form of water vapor or steam, may rise from the area where the beverage is prepared towards the discharge opening of the extruder. There, the moisture may be absorbed by the loose product and cause the product to lump together and degrade, as a result of which the extruder may start to malfunction (e.g. loose dosing accuracy or get stuck) and the beverages being prepared may diminish in quality.

SUMMARY OF THE INVENTION

It is an object of the present invention to provide for an extruder for use in a dispenser of a loose product that is substantially insensitive to operation in a moist environment, in particular because it protects the loose product to be dosed from undesired contact with water vapor or steam.

It is another object of the present invention to provide for a structurally simply, and economically manufacturable extruder that may be operated by a single, typically electric motor.

To this end, a first aspect of the present disclosure is directed to an extruder for use in a dispenser of a loose product for the preparation of typically hot beverages. The extruder may include a housing defining a product inlet, a product outlet, and a bore having a longitudinal axis, which bore may interconnect the product inlet and the product outlet. The extruder may further include a screw feeder comprising a screw blade, which screw blade is both rotatably and translatably received in the bore such that it is axially movable along the longitudinal axis of the bore between a first position and a second position. The extruder may also include a first sealing device that is configured to releasably fluidtightly seal a portion of the bore interconnecting the product inlet and the product outlet in dependence of the axial position of the screw blade. The configuration of the extruder may be such that, in said first axial position of the screw blade, the first sealing device may fluidtightly seal the portion of the bore interconnecting the product inlet and the product outlet. In the second axial position of the screw blade, in contrast, the first sealing device may not fluidtightly seal the portion of the bore interconnecting the product inlet and the product outlet, and rotation of the screw blade (in an extrusion sense of rotation) may effect the continuous extrusion or discharge of loose product, supplied at the product inlet, from the product outlet.

The extruder according to the present disclosure may comprises a screw feeder, including a rotatable screw blade, that is axially displaceable within a bore through which loose product to be dosed may be advanced until it is finally extruded therefrom. The rotatability of the screw blade of the screw feeder may enable accurate dosing of the loose product. The axial displaceability of the screw feeder may simultaneously enable it to serve as an operator of a first sealing device that may protect the bore from the ingress of moisture and/or air, which could cause degradation of the loose product by, respectively, lumping and oxidation. In a preferred embodiment of the extruder, this first sealing device may be a passive device that may be integrated with the screw feeder, such that it translates in unison therewith. In this latter configuration, the sealing device need not include any independently movable parts that could come into contact with moisture and/or (lumping) loose product, and that would therefore be prone to wear, soiling, clogging, getting stuck, etc. Furthermore, the extruder may advantageously be provided with a drive mechanism that enables the screw blade of the screw feeder to be selectively rotated and translated through a single drive shaft that is rotatably driveable in opposite senses of direction $R_1$, $R_2$, for instance by an electric drive motor.

A second aspect of the present disclosure is directed to a dispenser of a loose product for the preparation of beverages. The dispenser may include a hopper that is configured to contain the loose product, such as coffee ground, tea ground or cacao powder, and that includes a product discharge opening. The dispenser may also include an extruder according to the first aspect of the present disclosure, whose product inlet is connected to the product discharge opening of the hopper.

A third aspect of the present invention is directed to an apparatus or appliance for the preparation of beverages, such as coffee, tea or chocolate, including a dispenser according to the second aspect of the present disclosure.

These and other features and advantages of the invention will be more fully understood from the following detailed description of certain embodiments of the invention, taken together with the accompanying drawings, which are meant to illustrate and not to limit the invention.

BRIEF DESCRIPTION OF THE DRAWINGS

FIG. 2 schematically illustrates the construction of the extruder shown in FIG. 1, once in a top perspective view (FIG. 2A), and once in an exploded perspective view (FIG. 2B); and FIG. 3 schematically illustrates the operation of the extruder shown in FIGS. 1 and 2 in a cyclic sequence of four consecutive perspective views (FIGS. 3A-D).

DETAILED DESCRIPTION

Figure 1:
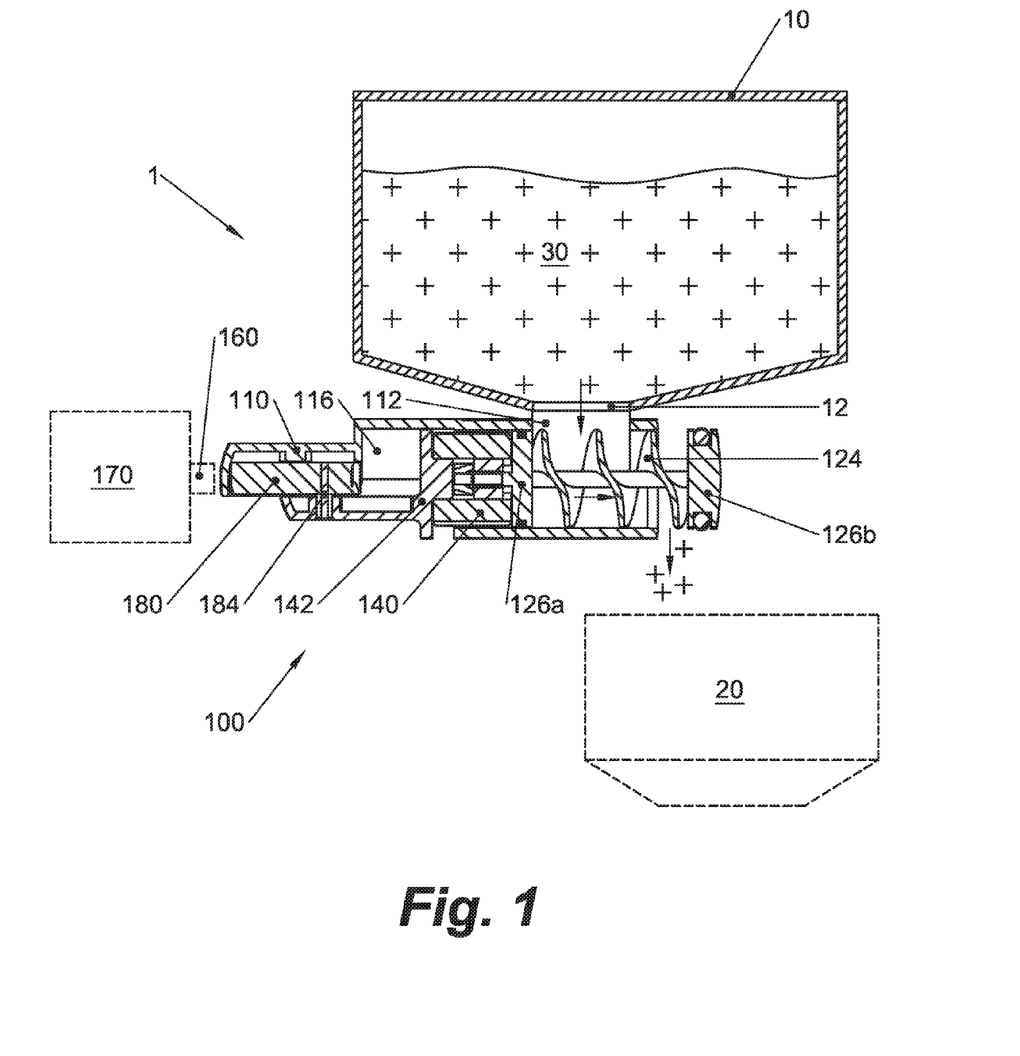
FIG. 1 schematically illustrates in a cross-sectional side view an exemplary embodiment of a dispenser of a loose product for the preparation of beverages, comprising a hopper and an exemplary embodiment of an extruder according to the present invention.

FIG. 1 schematically illustrates, in a cross-sectional side view, an exemplary embodiment of a dispenser 1 of a loose product 30 for the preparation of beverages, such as coffee ground, tea ground or cocao powder. The dispenser may include a hopper 10 and an extruder 100 that is connected thereto. The hopper 10 may define an interior space for preferably fluidtightly storing an amount of the loose product 30, and during operation supply the loose product 30 to a product supply opening 112 of the extruder 100 through a product discharge opening 12 in its bottom area. The openings 12, 112 may be interconnected, either directly (they may, for instance, coincide) or indirectly via a tube, chute or the like. The hopper 10 may in itself be of a conventional design.

Figure 2A:
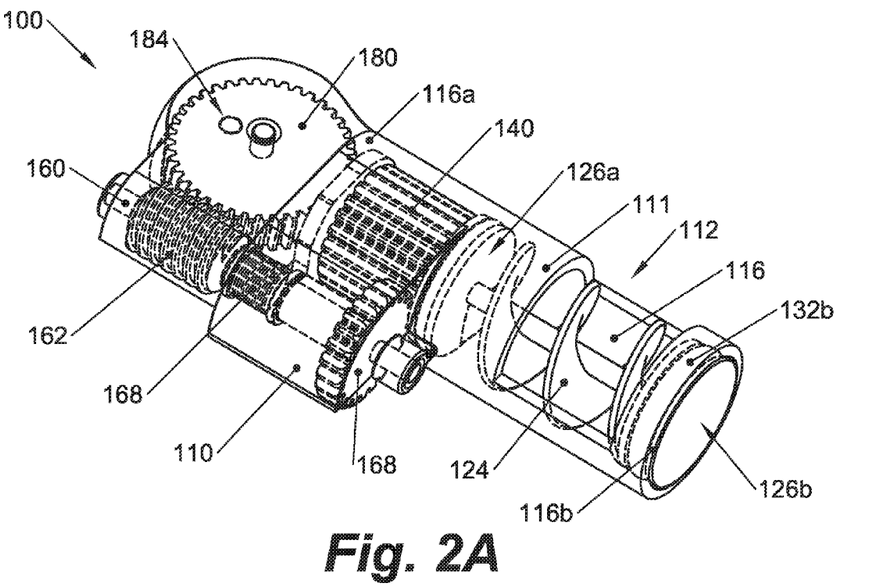
Figure 2B:
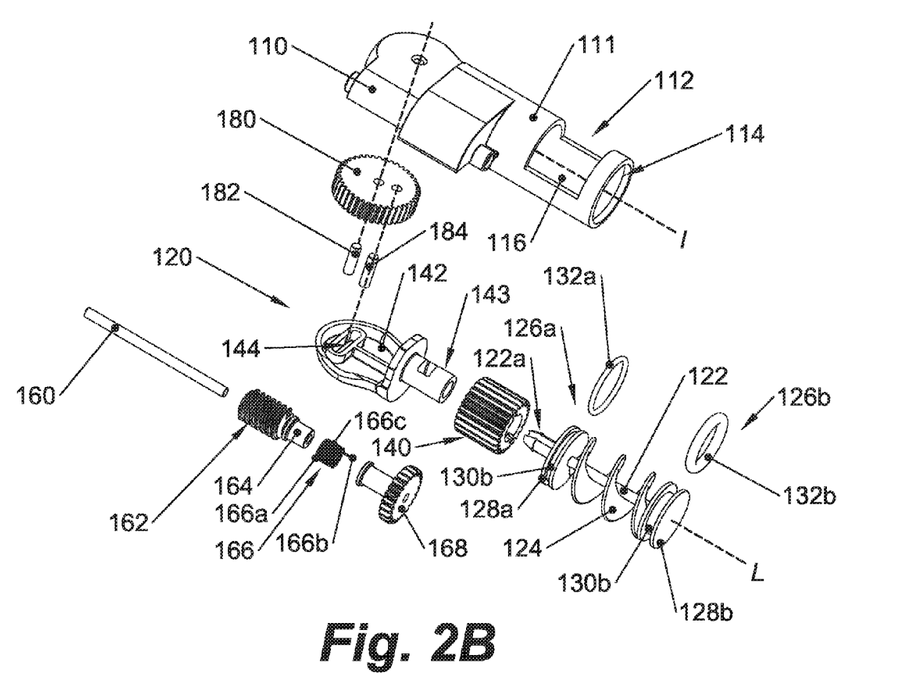

Below, the construction and the operation of the extruder 100 are described in general terms, and where appropriate with reference to FIGS. 1, 2 and 3.

Referring first to FIGS. 1 and 2. The extruder 100 may include a housing 110. When the extruder 100 is built in into an appliance, such as a coffee machine, the housing 110 may typically form an immovable or stationary component thereof. The housing 110 may define a bore or channel 116 having a longitudinal or central axis l, a product inlet 112 via which a loose product 30 may be supplied to the bore 116, and a product outlet 114 via which the loose product 30 may be extruded or discharged from the bore 116. The product inlet 112 and the product outlet 114 may be spaced apart along the longitudinal axis l of the bore 116, i.e. be provided at different axial positions thereof, such that a screw feeder 120 (to be discussed below) may be used to advance an accurate amount of loose product 30 from the product inlet 112 to the product outlet 114 via a portion of the bore 116 that interconnects them.

As in the depicted embodiment, the housing 110 may include a barrel 111 that defines the bore 116. The bore 116 may be of a preferably circular cross-section, and extend between an upstream end 116a and a downstream end 116b. These ends 116a, 116b may be open, but need not be. Although a cylindrical bore 116a is preferred for its axisymmetry, bores with a different shape, e.g. prismatic bores, are also contemplated. In an appliance, the housing 110 may preferably be mounted such that a central axis l of the bore 116 extends in a substantially horizontal direction (see FIG. 1), i.e. at an inclination of ±45° relative to the horizontal. The product inlet 112 may then be defined by an opening in a wall of the barrel 111, preferably arranged above the bore 116, so as to enable gravity to feed loose product into the bore 116 via the product inlet 112. In case the downstream end 116b of the barrel 111 is an open end, this downstream end 116b may define the product outlet 114 (see FIGS. 1 and 2). Alternatively, the product outlet 114 may be defined by an opening in the wall of the barrel 111, preferably arranged below the bore 116. In either case, gravity may be allowed to pull loose product 30 from the turns of a screw blade 124 of the screw feeder 120 (to be described below) when these turns respectively protrude from the downstream end 116b of the bore 116 (see FIG. 1) or extend over the product outlet 144, so as to discharge the loose product 30 from the extruder 100. It is understood that in an appliance the product outlet 114 of the extruder 100 may be arranged above or otherwise in communication with a product discharge location 20, such as a filter basket in the case of a coffee maker (see FIG. 1).

The extruder 100 may further include a screw feeder 120. The screw feeder 120, in turn, may include a screw blade, helical blade or fighting 124 that is centered on a central rotation axis L. As in the depicted embodiment, the screw blade 124 may be mounted on a shaft 122 that coincides with its central rotation axis L; alternatively, the screw blade 124 may be 'shaftless' or 'centerless'. The screw blade 124 may be dimensioned such that it is fittingly receivable inside the bore 116; that is, it may be dimensioned such that the turns of the screw blade have an outer diameter that is only slightly smaller, e.g. less than 10% smaller, than a diameter of the (inscribed circle associated with the) the bore 116.

For terminological clarity, it is noted that the term 'screw feeder' as used in this text may be construed to refer to the assembly or collection of extruder parts that share the translational motions of the screw blade 124, i.e. the parts of the extruder that translate in unison with the screw blade 124 as it axially moves inside the bore 116. The screw feeder 120 of the exemplary embodiment of the extruder 100 may thus, besides the screw blade 124 and the shaft 122 on which it is mounted, be regarded to include a connection member 142, a second, elongated gear wheel 140, and sealing devices 126a, 126b (see FIG. 2B), all of which are discussed hereafter.

The extruder 100 may also include at least one sealing device 126a that is configured to releasably fluidtightly seal a portion of the bore 116 interconnecting the product inlet 112 and the product outlet 114 in dependence of the axial position of the screw blade 124. The portion of the bore 116 interconnecting the product inlet 112 and the product outlet 114 may be regarded to be fluidtightly sealed whenever a fluid, in particular water and/or air, cannot be continuously supplied at the product inlet 112 and discharged from the product outlet 114, and/or vice versa. Accordingly, the portion of the bore 116 may be fluidtightly sealed by blocking the product inlet 112, blocking the product outlet 114, and/or providing an obstruction inside a portion of the bore 116 extending therebetween.

Operation of the sealing device 126a in dependence of the axial position of the screw blade 124 may be established in various ways. In some embodiments the sealing device 126a may not form part of the screw-feeder 120, and merely be operated by it, either directly or indirectly via a mechanical linkage or the like. In one embodiment, for instance, the sealing device may include a spring-loaded pivotable product outlet cover that is biased to seal the product outlet 114, and that can be manipulated into an open, non-sealing position by the screw blade 124 when the screw blade is axially displaced and pushed against the cover, through the product outlet 114. In preferred embodiments of the extruder, however, the sealing device 126a may form a part of the screw feeder 120, as this may generally allow for a simpler construction of the extruder 100 with less independently movable parts and a greater overall reliability.

In one such preferred embodiment, the sealing device 126a may be connected to the screw blade 124. The sealing device 126a, 126b may, for instance, be connected to the screw blade 124 itself, e.g. at an end thereof, and/or, in case a shaft 124 is provided, be mounted on the shaft 124. When the at least one sealing device 126 is mounted on the shaft 122, it may be either fixedly mounted thereon, such that it necessarily shares the rotational motions of the shaft 122, or be rotatably mounted thereon, such that is does not necessarily do so.

In case multiple sealing devices 126 are provided, they may be spaced apart along the longitudinal axis L of the screw blade 124 or along the shaft 122. As in the depicted embodiment, for instance, the screw feeder 120 may include two structurally identical sealing devices 126a, 126b, one arranged at each end of the screw blade 124. As mentioned the first, downstream sealing device 126b may serve to releasably fluidtightly seal the portion of the bore 116 interconnecting the product inlet 112 and the product outlet 114 in dependence of the axial position of the screw blade 124. The second, upstream sealing device 126a may serve to permanently seal an upstream portion of the bore 116 extending between the first end 116a of the bore 116 and the product inlet 112, so as to prevent loose product 30 from accumulating therein, which could frustrate the back and forth translation of the screw blade 124

Each sealing device 126a, 126b may include a typically rigid fluid-impermeable body 128a, 128b. The body 128a, 128b may preferably have a shape similar to that of the bore 116 and preferably be dimensioned such that it is fittingly receivable therein, i.e. with only a little circumferential play, when its central axis is aligned with the longitudinal axis l of the bore 116. For instance, in embodiments featuring a cylindrical bore 116, the body 128a, 128b may typically also be cylindrical, and have an outer diameter that is slightly smaller, e.g. less than 10% smaller, than the diameter of the bore 116. Furthermore, the body 128a, 128b of each sealing device 126a, 126b may define a tangentially extending, circumferential recess 130a, 130b in its outer surface, and each sealing device 126a, 126b may additionally include a flexible O-ring 132a, 132b that is configured to be received in the respective circumferential recess 130a, 130b, such that, when the sealing device 126a, 126b is received inside a circumferentially or tangentially closed portion of the bore 116, the flexible O-ring abuts (an inner surface of) the wall bounding the bore, and the sealing device 126a, 126b as a whole fluidtightly seals the bore.

The screw blade 124 may be both rotatably and translatably received in the bore 116, such that it is translatable, i.e. linearly movable, between a first position and a second position.

In the first position (see FIG. 2A and FIG. 3A), the at least one sealing device 126b may block the product outlet 114, and hence seal the portion of the bore 116 interconnecting the product inlet 112 and the product outlet 114. Accordingly, the at least one sealing device 126b may, on the one hand, prevent the downstream advancement of loose product 120 from the product inlet 112 to the product outlet 114 through rotation of the screw blade 124, and, on the other hand, prevent loose product 30 present at the upstream side of the sealing device 126b from contact with moisture.

In the second position (see FIG. 3C), none of the sealing devices 126a, 126b may fluidtightly seal the portion of the bore 116 interconnecting the product inlet 112 and the product outlet 114. Accordingly, rotation of the screw blade 124 may effect the continuous extrusion of loose product 30, supplied at the product inlet 112, from the product outlet 114.

The extruder 100 may further include a drive mechanism to selectively rotate and translate the screw blade 124. In a preferred embodiment, such as the depicted embodiment, the drive mechanism may be configured to enable such operation of the screw blade 124 exclusively through a drive shaft 160 that is rotatably driveable in opposite senses of direction $R_1$, $R_2$, for instance by an electric drive motor 170. The drive shaft 160, which, like the drive motor 170, may form a part of the drive mechanism, may be rotatably bearing mounted in the housing 110.

The drive mechanism may further include a rotary-to-linear-motion converter. This rotary-to-linear-motion-converter may preferably be configured to convert rotational motion of the drive shaft 160 in a first sense of rotation $R_1$ into axial reciprocating motion of the screw feeder 120 within the bore 116, and not to convert rotational motion of the drive shaft 160 in a second sense of direction $R_2$ into axial motion of the screw feeder 120. One skilled in the art will appreciate that rotary-to-linear-motion-converters are in themselves known in the art, and may be constructed in a variety of ways. By way of enabling and preferred example, one embodiment of a rotary-to-linear-motion converter is elucidated below.

In this one embodiment, the rotary-to-linear-motion converter may include a worm 162, which may be connected to and extend coaxially with the drive shaft 160. At one of its axial ends, the worm 162 may define a typically cylinder jacket-shaped worm shaft or worm extension member 164 that is configured for engagement with the uni-directional rotation transfer device 166 to be discussed hereafter.

The rotary-to-linear-motion converter may further include a uni-directional rotation transfer device 166 that interconnects the drive shaft 160 and the worm 162, such that rotation of the drive shaft 160 in the second sense of rotation $R_2$ causes rotation of the worm 162 with the drive shaft in said second sense of rotation $R_2$, and such that rotation of the drive shaft 160 in the first sense of rotation $R_1$ does not cause rotation of the worm 162 with the drive shaft in said first sense of rotation $R_1$.

The uni-directional rotation transfer device may, for instance, include a wire 166 having a first end 166a and a second end 166b. In between its first and second ends 166a, 166b, the wire 166 may define a helically wound coil 166c. The coil 166c may extend around the worm shaft 164 of the worm 162, while one of the first and second ends 166a, 166b of the wire 166 may be connected to the drive shaft 160. The configuration may be such that rotation of the drive shaft 160 in the first sense of rotation $R_1$ causes loosening of the coil 166c, such that the coil substantially disengages the worm shaft 164 and fails to cause its rotation in the first sense of rotation $R_1$, while rotation of the drive shaft 160 in the second sense of rotation $R_2$ causes tightening of the coil 166c, such that the coil 166c frictionally engages the worm shaft 164 of the worm 162 and causes its rotation in the second sense of rotation $R_2$.

The rotary-to-linear-motion-converter may also include a worm wheel 180, e.g. a spur gear or helical gear, that is rotatably connected to the housing 110 via a central shaft pin 182, and that meshes with the worm 162. The worm wheel 180 may include an excenter pin 184 that is configured for engagement with a connection member 142 to be described hereafter.

The rotary-to-linear-motion-converter may additionally include a connection member 142. The connection member 142 may be rotatably connected to the (shaft 122 of the) screw blade 124, such that it may translate together with the screw blade 124, and may simultaneously allow for rotation of the screw blade 124 around its axis L relative to the connection member 142. To this end, as in the depicted embodiment, a downstream end face of the connection member 142 may include a cylinder jacket-shaped hub portion 143 that extends coaxially with the screw blade 124, and that has a stepwise increasing inner diameter as seen in the upstream direction, so as to define a inner circumferential ledge. The shaft 122 of the screw blade 124, in turn, may include two resilient prongs 122a that extend upstream from the body 128b of the second sealing device 126a. The resilient prongs 122a may be receivable inside the hub portion 143, such that the heads of the resilient prongs snappingly catch on the circumferential ledge. Accordingly, the screw blade 124 may be locked against translational separation from the connection member 124 while enabling its rotation relative thereto. For its connection to the worm wheel 180, the connection member 142 may further define a slot 144 in which the excenter pin 184 of the worm wheel 180 is slidably receivable.

It is understood that the worm wheel 180, the excenter pin 184, the slot 144 and the connection member 142, which may together fulfil a function similar to that of a crank shaft and a (piston) connection rod in a combustion engine, may be arranged such that rotation of the worm wheel 180 (due to rotation of the worm 162) causes the reciprocating linear/axial motion of the screw feeder 120 in the bore 160.

The drive mechanism may also include a rotation-coupling that is configured to rotatably couple the drive shaft 160 and the screw blade 124, such that rotation of the drive shaft in a second sense of rotation $R_2$ causes rotation of the screw blade 124 of the screw feeder 120 in an extrusion sense of rotation $E_2$. An 'extrusion sense of rotation' is understood to refer to a sense of rotation $E_2$ of the screw blade 124 around its central axis L that, in use, effects the movement/transport of loose product 30 in a downstream direction, from the product inlet 112 to the product outlet 114.

The rotation-coupling may include a first gear wheel 168, which may be coaxially connected to (the shaft 122 of the) screw blade 124 such that it rotates in unison therewith. To this end, as in the depicted embodiment, a downstream end face of the first gear wheel 168 may include a plurality of recesses (visible in FIG. 2B) configured to axially receive a same plurality of cams provided on the upstream end face of the body 128a of the second sealing device 126a (not visible in FIG. 2B), so as to rotatably lock the two parts together. A central passage through the first gear wheel 168 may further be dimensioned to rotatably receive the hub portion 143 of the connection member 142. In an assembled condition of the extruder 100, the first gear wheel 168 may be snugly received between the downstream end face of the connection member 142 from which the hub portion 143 protrudes, and the upstream end face of the body 128a of the second sealing device 126a. The second gear wheel 140 may be an elongated gear wheel, having relatively long teeth that extend in parallel with the longitudinal axis l of the bore 116 and/or the longitudinal axis L of the screw blade 124. The second gear wheel 140 may be arranged to mesh with the first gear wheel 168, either directly or via further gear wheels and the like, at least over the screw feeder's range of linear motion between its first and second position.

Accordingly, rotation of the drive shaft 160 in the first sense of rotation $R_1$ may cause rotation of the screw blade 124 in a non-extrusion sense of rotation $E_1$, while rotation of the drive shaft 160 in the second sense of rotation $R_2$ may cause rotation of the screw blade 124 in the extrusion sense of rotation $E_2$.

The drive mechanism may also include a controller (not shown), which may be operably connected to the drive motor 170 to control its operation. In order for the controller to reliably keep track of the axial position of the screw blade 124 over time, the drive mechanism may further include one or more preferably contactless position sensors, which may be operably connected to the controller. In one embodiment the drive mechanism may include a position sensor configured to monitor the axial position of the screw feeder 120, including two permanent magnets and a reed sensor. The permanent magnets may be fixedly connected to screw feeder 120 in an axially spaced apart relationship, while the reed sensor may be fixedly connected to the housing 110 of the extruder 100. The permanent magnets may be arranged such that, in the first (axial) position of the screw blade 124, a first of the permanent magnets is in registry with and triggers the reed sensor, while in the second (axial) position of the screw blade 124, a second of the permanent magnets is in registry with and triggers the reed sensor. This way, the controller is able to assess, other than through for instance counting the number of revolutions of the drive shaft 160 reported by the motor 170, when the screw blade 124 arrives at and leaves its first and second positions. It will be clear that a position sensor need not necessarily be configured to track the axial position of the screw feeder 120; in an alternative embodiment, for instance, a position sensor may be configured to track the rotational position of the worm wheel 180.

Now that the construction of the extruder 100 has been described in some detail, attention is invited to its operation, which will be elucidated with reference to FIGS. 3A-D.

Figures 3A, 3B:
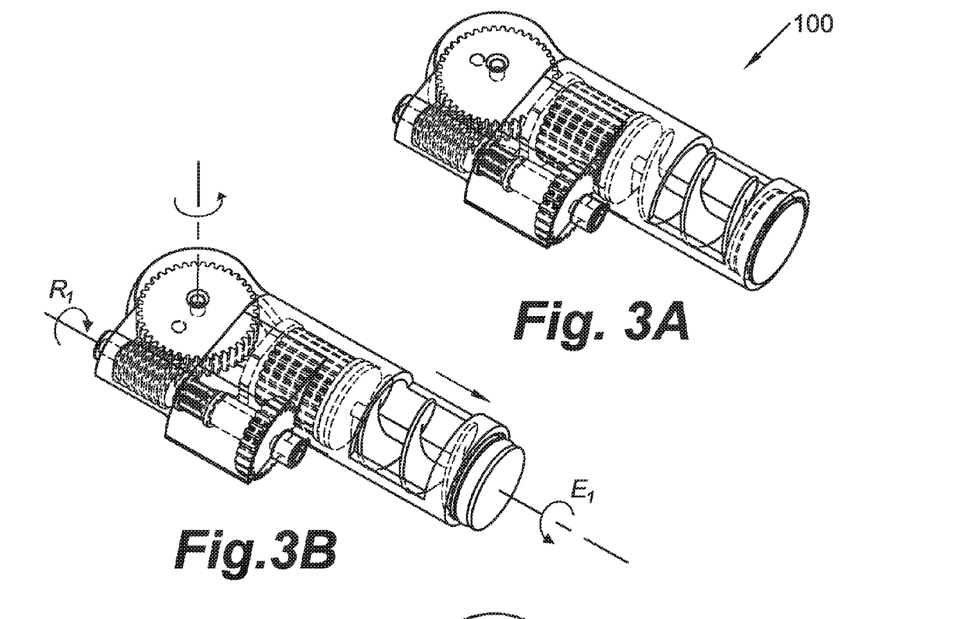

FIG. 3A schematically illustrates the extruder 100 of FIG. 2 in a rest position in which the parts of the extruder 100 are not in motion as the drive shaft 160 is not driven in either sense of rotation $R_1$, $R_2$. In this rest position, the screw feeder 120 is in its first axial position. The first sealing device 126b is disposed within the bore 116, and fluidtightly seals the portion of the bore 116 that interconnects the product inlet 112 and the product outlet 114. In this first axial position of the screw feeder 120, rotation of the screw blade 124 in the extrusion sense of rotation $E_2$ cannot effect a continuous extrusion of loose product 30, supplied at the product inlet 112, from the product outlet 114.

When such extrusion of loose product 30 is desired, the drive shaft 160 may first be rotated in the first sense of rotation $R_1$, as shown in FIG. 3B. Through the intermediation of the rotary-to-linear-motion converter, the rotation of the drive shaft 160 causes the downstream or axially outward displacement of the screw feeder 120 within the bore 116. As the screw feeder 120 moves downstream, the first sealing device 126b is forced from the bore 116 and out of the product outlet 114. The removal of the first sealing device 126b from the bore 116 leaves the bore 116 unsealed and capable of facilitating transport of loose product 30 from the product inlet 112 to the product outlet 114. It is noted, however, that the rotation of the drive shaft 160 in the first sense of rotation $R_1$ does not yet cause the actual extrusion of loose product 30 from the product outlet 114 since, during its downstream displacement, the screw blade 124 rotates in the non-extrusion direction $E_1$ (such that it effectively transports loose product 30 present between the windings of the screw blade 124 inward or upstream, towards the product inlet 112).

Figures 3C, 3D:
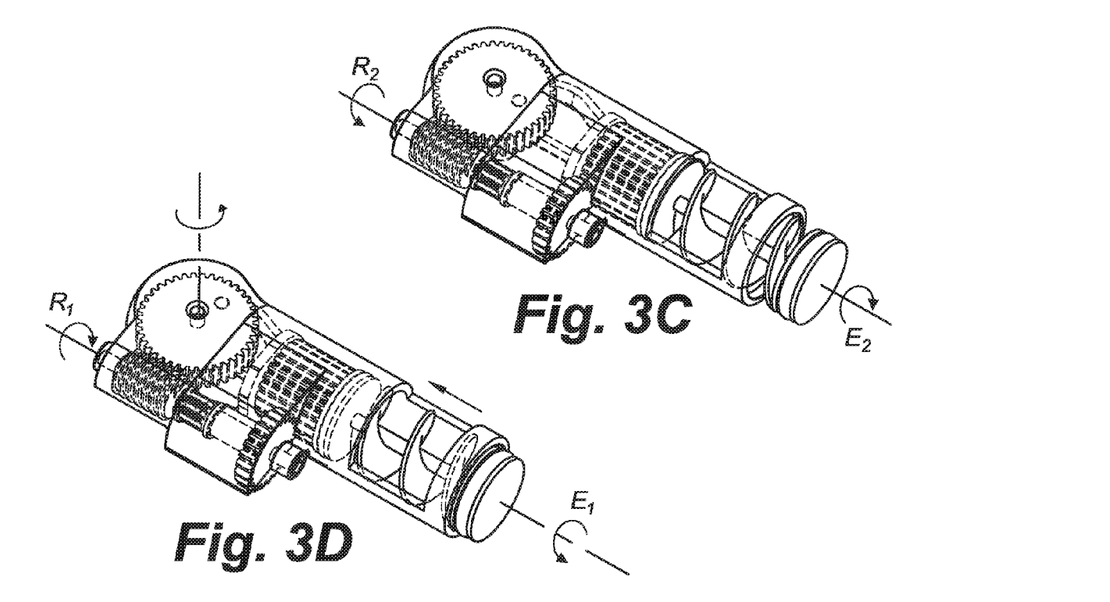

Once the screw feeder 120 reaches its second position, in which it extends maximally from the product outlet 114, the sense of rotation of the drive shaft 160 may be reversed. That is, the drive shaft 160 may now be driven in the second sense of rotation $R_2$, as shown in FIG. 3C. When the drive shaft 160 is so driven, the uni-directional rotational transfer device 166 of the rotary-to-linear-motion converter prevents rotation of the worm 162, and hence further axial displacement of the screw feeder 120. The rotation-coupling, however, now ensures that the screw blade 124 of the screw feeder 120 is rotated in the extrusion sense of rotation $E_2$. Accordingly, loose product 30 may be continuously supplied to the extruder 100 at the product inlet 112, for instance from a hopper 10, transported to the product outlet 114, and extruded or discharged therefrom.

When a desired amount of loose product 30 has been extruded, the sense of rotation of the drive shaft 160 may again be reversed, as shown in FIG. 3D. By virtue of the re-engaging rotary-to-linear-motion converter, the further rotation of the drive shaft 160 in the first sense of rotation $R_1$ now causes the retraction of the screw blade 124 into the bore 116 of the housing 110, while the screw blade 124 rotates in the non-extrusion sense of rotation $E_1$. Rotation of the drive shaft 160 may be stopped once the screw feeder 120 again reaches its rest position, shown in FIG. 3A.

As regards the terminology used in this text, the following may be noted. The terms 'upstream' and 'downstream' may be related to the relative axial arrangement of the product inlet and the product outlet, and the direction in which loose product is to be advanced through the bore between them in order to cause its extrusion. Accordingly, 'downstream' may refer to the axial direction pointing from the axial position of the product inlet to the product outlet, while 'upstream' may refer to the parallel but opposite direction.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

The invention claimed is:

1. An extruder for use in a dispenser of a loose product for the preparation of beverages, comprising:
   a housing, defining a product inlet, a product outlet, and a bore having a longitudinal axis, which bore interconnects the product inlet and the product outlet;
   a screw feeder including a screw blade that is both rotatably and translatably received in the bore, such that it is axially movable along the longitudinal axis between a first position and a second position;
   a first sealing device that is configured to fluidtightly seal a portion of the bore interconnecting the product inlet, and the product outlet in dependence of the axial position of the screw blade, such that
   in said first position of the screw blade, the first sealing device fluidtightly seals the portion of the bore interconnecting the product inlet and the product outlet, while
   in said second position of the screw blade, rotation of the screw blade can effect a continuous extrusion of loose product, supplied at the product inlet, from the product outlet; and
   a drive mechanism coupled to the screw blade and configured to convert rotational motion in a first direction of rotation into linear, reciprocating motion of the screw blade within the bore and configured to convert rotational motion in a second direction of rotation into rotation of the screw blade in an extrusion sense of rotation.

2. The extruder according to claim 1, wherein the first sealing device is connected to the screw blade of the screw feeder, such that it translates in unison therewith.

3. The extruder according to claim 2, wherein the first sealing device is provided at an axial end of the screw blade.

4. The extruder according to claim 1, wherein the bore is substantially cylindrical, and
   wherein a rotation axis of the screw blade is aligned with the longitudinal axis of the bore.

5. The extruder according to claim 1, wherein the screw blade is fittingly received inside the cylindrical bore.

6. The extruder according to claim 1, wherein the bore extends axially between a first end an open second end, which second end defines the product outlet.

7. A dispenser of a loose product for the preparation of beverages, comprising:
   a hopper configured to contain the loose product and including a product discharge opening; and
   an extruder according to claim 1, whose product inlet is connected to the product discharge opening of the hopper.

8. An apparatus for the preparation of beverages, including a dispenser according to claim 7.

9. An extruder for use in a dispenser of a loose product for the preparation of beverages, comprising:
   a housing, defining a product inlet, a product outlet, and a bore having a longitudinal axis, which bore interconnects the product inlet and the product outlet;
   a screw feeder including a screw blade that is both rotatably and translatably received in the bore, such that it is axially movable along the longitudinal axis between a first position and a second position; and
   a first sealing device that is configured to fluidtightly seal a portion of the bore interconnecting the product inlet and the product outlet in dependence of the axial position of the screw blade, such that
   in said first position of the screw blade, the first sealing device fluidtightly seals the portion of the bore interconnecting the product inlet and the product outlet, while
   in said second position of the screw blade, rotation of the screw blade can effect a continuous extrusion of loose product, supplied at the product inlet, from the product outlet;
   a drive shaft, configured to be rotationally driven by a motor;
   a rotary-to-linear-motion converter that is configured to convert rotational motion of the drive shaft in a first sense of rotation into linear, reciprocating motion of the screw blade within the bore; and
   a rotation-coupling that is configured to rotatably couple the drive shaft and the screw blade such that rotation of the drive shaft in a second sense of rotation causes rotation of the screw blade in an extrusion sense of rotation.

10. The extruder according to claim 9, wherein the rotation-coupling is configured to rotatably couple the drive shaft and the screw blade such that rotation of the drive shaft in the first sense of rotation does not cause rotation of the screw feeder in said extrusion sense of rotation.

11. The extruder according to claim 9, wherein the rotation-coupling comprises:

a first gear wheel that is mounted on the drive shaft such that it is capable of transferring torque from the drive shaft when the drive shaft is rotated in said second sense of rotation; and a second gear wheel that is connected to the screw blade such that it is capable of transferring torque to the screw blade so as to rotationally drive the screw blade in said extrusion sense of rotation, which second gear wheel either directly or via further gears meshes with the first gear wheel, at least over the screw feeder's range of linear motion between its first and second positions.

12. The extruder according to claim 9, wherein the rotary-to-linear-motion converter comprises:

a worm, mounted on the drive shaft;

a uni-directional rotation transfer device that interconnects the drive shaft and the worm, such that rotation of the drive shaft in the second sense of rotation causes rotation of the worm with the drive shaft in said second sense of rotation;

a worm wheel that is rotatably connected to the housing and that meshes with the worm; and a connection member that, on the one hand, excentrically connects to the worm wheel, and, on the other hand, connects to the screw blade, such that the screw blade is subject to reciprocating linear motion within the bore when the worm wheel is rotationally driven by the worm.

13. The extruder according to claim 12, wherein the uni-directional rotation transfer device includes a wire having a first end and a second end, and defining a helically wound coil in between said first and said second ends, wherein said coil extends around a worm shaft of the worm, and wherein one of said first and second ends is connected to the drive shaft, such that, rotation of the drive shaft in the first sense of rotation causes loosening of the coil, such that the coil substantially disengages the worm shaft of the worm and fails to cause its rotation in the first sense of rotation, while rotation of the drive shaft in the second sense of rotation causes tightening of the coil, such that the coil frictionally engages the worm shaft of the worm and causes its rotation in the second sense of rotation.

14. An extruder for use in a dispenser of a loose product for the preparation of beverages, comprising:

a housing, defining a product inlet, a product outlet, and a bore having a longitudinal axis, which bore interconnects the product inlet and the product outlet;

a screw feeder including a screw blade that is both rotatably and translatably received in the bore, such that it is axially movable along the longitudinal axis between a first position and a second position; and a first sealing device that is configured to fluidtightly seal a portion of the bore interconnecting the product inlet and the product outlet in dependence of the axial position of the screw blade, such that in said first position of the screw blade, the first sealing device fluidtightly seals the portion of the bore interconnecting the product inlet and the productoutlet, while in said second position of the screw blade, rotation of the screw blade can effect a continuous extrusion of loose product, supplied at the product inlet, from the product outlet, wherein the first sealing device is connected to the screw blade of the screw feeder, such that it translates in unison therewith and comprises:

a fluid-impermeable body having a cross-sectional shape similar to that of the bore and dimensioned such that it is receivable inside the bore, said body defining a tangentially extending circumferential recess;

a flexible O-ring that is received in said circumferential recess, such that, when the first sealing device is received inside a tangentially closed portion of the bore, the O-ring abuts the housing bounding the bore, and the first sealing device fluidtightly seals the bore.

15. An extruder for use in a dispenser of a loose product for the preparation of beverages, comprising:

a housing, defining a product inlet, a product outlet, and a bore having a longitudinal axis, which bore interconnects the product inlet and the product outlet;

a screw feeder including a screw blade that is both rotatably and translatably received in the bore, such that it is axially movable along the longitudinal axis between a first position and a second position; and a first sealing device that is configured to fluidtightly seal a portion of the bore interconnecting the product inlet and the product outlet in dependence of the axial position of the screw blade, such that in said first position of the screw blade, the first sealing device fluidtightly seals the portion of the bore interconnecting the product inlet and the product outlet, while in said second position of the screw blade, rotation of the screw blade can effect a continuous extrusion of loose product, supplied at the product inlet, from the product outlet, wherein the bore extends axially between a first end and an open second end, which second end defines the product outlet, wherein the product inlet connects to the bore in between the first end and the second end, and wherein the screw feeder further includes a second sealing device that is connected to the screw blade at an axial end thereof, such that, in both the first and second positions of the screw blade, the second sealing device seals a portion of the bore extending between the first end and the product inlet.

* * * * *